United States Patent
Kuo

(10) Patent No.: US 7,944,982 B2
(45) Date of Patent: May 17, 2011

(54) METHOD AND RELATED APPARATUS FOR IMPROVING MIMO PROCEDURE IN A WIRELESS COMMUNICATIONS SYSTEM

(75) Inventor: Richard Lee-Chee Kuo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 696 days.

(21) Appl. No.: 12/004,000

(22) Filed: Jan. 4, 2008

(65) Prior Publication Data

US 2008/0175329 A1 Jul. 24, 2008

Related U.S. Application Data

(60) Provisional application No. 60/885,921, filed on Jan. 22, 2007.

(51) Int. Cl.
*H04L 27/28* (2006.01)

(52) U.S. Cl. ........................................... 375/260

(58) Field of Classification Search .................. 375/267, 375/299, 230, 347, 349, 260; 700/53; 455/101, 455/132–141
See application file for complete search history.

(56) References Cited

U.S. PATENT DOCUMENTS

| 7,269,127 | B2 | 9/2007 | Mody |
| 7,385,959 | B1 | 6/2008 | Loc |
| 2004/0082356 | A1 | 4/2004 | Walton |
| 2005/0026616 | A1 | 2/2005 | Cavalli |
| 2005/0213538 | A1* | 9/2005 | Ebiko et al. ............. 370/331 |
| 2005/0286408 | A1 | 12/2005 | Jin |
| 2006/0271649 | A1* | 11/2006 | Tseng et al. ............. 709/220 |
| 2006/0288204 | A1 | 12/2006 | Sood |
| 2007/0060159 | A1* | 3/2007 | Utsunomiya et al. ...... 455/450 |
| 2007/0064949 | A1 | 3/2007 | Choi |
| 2007/0183303 | A1 | 8/2007 | Pi |
| 2008/0080449 | A1 | 4/2008 | Huang |
| 2008/0151743 | A1 | 6/2008 | Tong |
| 2008/0313519 | A1 | 12/2008 | Tseng |
| 2009/0147879 | A1* | 6/2009 | Sandhu ..................... 375/267 |

FOREIGN PATENT DOCUMENTS

| JP | 20047279 A | 1/2004 |
| JP | 2005318332 A | 11/2005 |
| JP | 2005348116 A | 12/2005 |
| JP | 200642075 A | 2/2006 |
| JP | 2006303665 A | 11/2006 |
| KR | 1020060007617 | 1/2006 |

OTHER PUBLICATIONS

3GPP TSG-RAN WG2 Meeting #56 (Nov 6th to 10th, 2006), Change Request R2-063342 "LS on status of Rel-7 FDD MIMO".
3GPP TSG-RAN2 WG2 Meeting #56bis (Jan. 15th to 19th, 2007), Draft Change Request R2-070241 rev1 Proposed CR to TS 25.331 [Rel-7] on Introducing MIMO in RRC specification.
3GPP TS 25.331 V7.3.0 (Dec. 2006) Radio Resource Control (RRC); Protocol Specification (Release 7).
3GPP TSG-RAN2 Meeting #57 (Feb. 12-16, 2007) R2-071092. Proposed CR to TS 25.331 [Rel-7] on Introducing MIMO in RRC specification. XP-002482056.

(Continued)

*Primary Examiner* — Sam K Ahn

(57) ABSTRACT

In order to avoid malfunction of lower layers of a user equipment, known as UE, in a wireless communications system, the present invention provides a method of improving a multi-input multi-output, known as MIMO, procedure. The method includes the following steps. A MIMO operation is activated, and the MIMO operation is then de-activated when the UE initiates a cell update procedure.

8 Claims, 3 Drawing Sheets

OTHER PUBLICATIONS

3GPP TSG-RAN WG2 Meeting #56-bis (Jan. 15-19, 2007) R2-070194. Impact of MIMO on RAN2 Specifications. XP-002482050.

3GPP TSG-RAN WG2 Meeting #56-bis (Jan. 15-19, 2007) R2-070192. Introducing MIMO in HSDPA Stage 2 specification. XP-002482052.

* cited by examiner

METHOD AND RELATED APPARATUS FOR IMPROVING MIMO PROCEDURE IN A WIRELESS COMMUNICATIONS SYSTEM

CROSS REFERENCE TO RELATED APPLICATIONS

This application claims the benefit of U.S. Provisional Application No. 60/885,921, filed on Jan. 22, 2007 and entitled "Method And Apparatus for Improving MIMO Procedures in a Wireless Communication System", the contents of which are incorporated herein by reference.

BACKGROUND OF THE INVENTION

1. Field of the Invention

The present invention relates to a method for improving a MIMO procedure for a wireless communications system and related communications device, and more particularly to a method for improving a MIMO procedure about de-activation of a MIMO operation for a user equipment (UE) of a wireless communications system and related communications device.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting at the third generation mobile telecommunication technology, the 3rd Generation Partnership Project (3GPP) provides High Speed Package Access (HSPA) technology, which includes High Speed Downlink Package Access (HSDPA) and High Speed Uplink Package Access (HSUPA), to increase bandwidth utility rate and package data processing efficiency so as to improve uplink/downlink transmission rate.

To further increase the downlink data rate, 3GPP introduces a Multi-input Multi-output (MIMO) technology, with which a user equipment (UE) and a base station, known as a Node-B, utilize multiple antennas to transmit/receive radio signals. Besides, the MIMO technology can be further incorporated with spatial multiplexing, beam forming and spatial diversity technologies to reduce signal interference and increase channel capacity. In the prior art, the MIMO operation is mainly employed to the HSDPA system, doubling the peak rate of high speed downlink share channel (HS-DSCH). Concerning radio resource control (RRC) states of the UE, the MIMO operation is only applicable for the UE in CELL_DCH state.

To control MIMO operation of the UE, a universal terrestrial radio access network (UTRAN) can set configuration of MIMO operation in information elements (IEs) of RRC messages and send the RRC messages and IEs to the UE through corresponding RRC procedures. According to an RRC protocol specification of 3GPP, a MIMO parameter IE, having MIMO configuration data for the UE, can be included in reconfiguration messages, such as RRC CONNECTION SETUP, ACTIVE SET UPDATE, CELL UPDATE CONFIRM messages. On the other hand, the UE includes a MIMO_STATUS variable to store the MIMO configuration data included in the MIMO parameter IE. When the UE activates the MIMO operation, the UE needs to trigger lower layers to start operation in a MIMO mode according to the MIMO_STATUS variable.

During the MIMO operation, if radio link failure occurs, or a radio link control (RLC) unrecoverable error occurs, or transmission of a UE CAPABILITY INFORMATION message fails, the UE will initiate a cell update procedure to remedy the situations. When a cell update procedure is initiated, the UE shall enter CELL_FACH state to select a suitable cell. That is, the UE transits from CELL_DCH state to CELL_FACH state during the MIMO operation.

However, according to the prior art, the MIMO operation is only applied to a UE in CELL_DCH state. Furthermore, the prior art does not specify the UE action about leaving CELL_DCH state during MIMO operation. Thus, the above situations can occur system malfunction in the UE.

SUMMARY OF THE INVENTION

The present invention therefore provides a method of improving a MIMO procedure for a UE of a wireless communications system and related communications device that can timely de-activate MIMO operation to avoid system malfunction.

The present invention discloses a method for improving a MIMO procedure for a UE of a wireless communications system. The method includes activating a MIMO operation, and de-activating the MIMO operation when a cell update procedure is initiated.

The present invention further discloses a communications device of a wireless communications system for improving a MIMO procedure to avoid system malfunction. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes activating a MIMO operation, and de-activating the MIMO operation when a cell update procedure is initiated.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
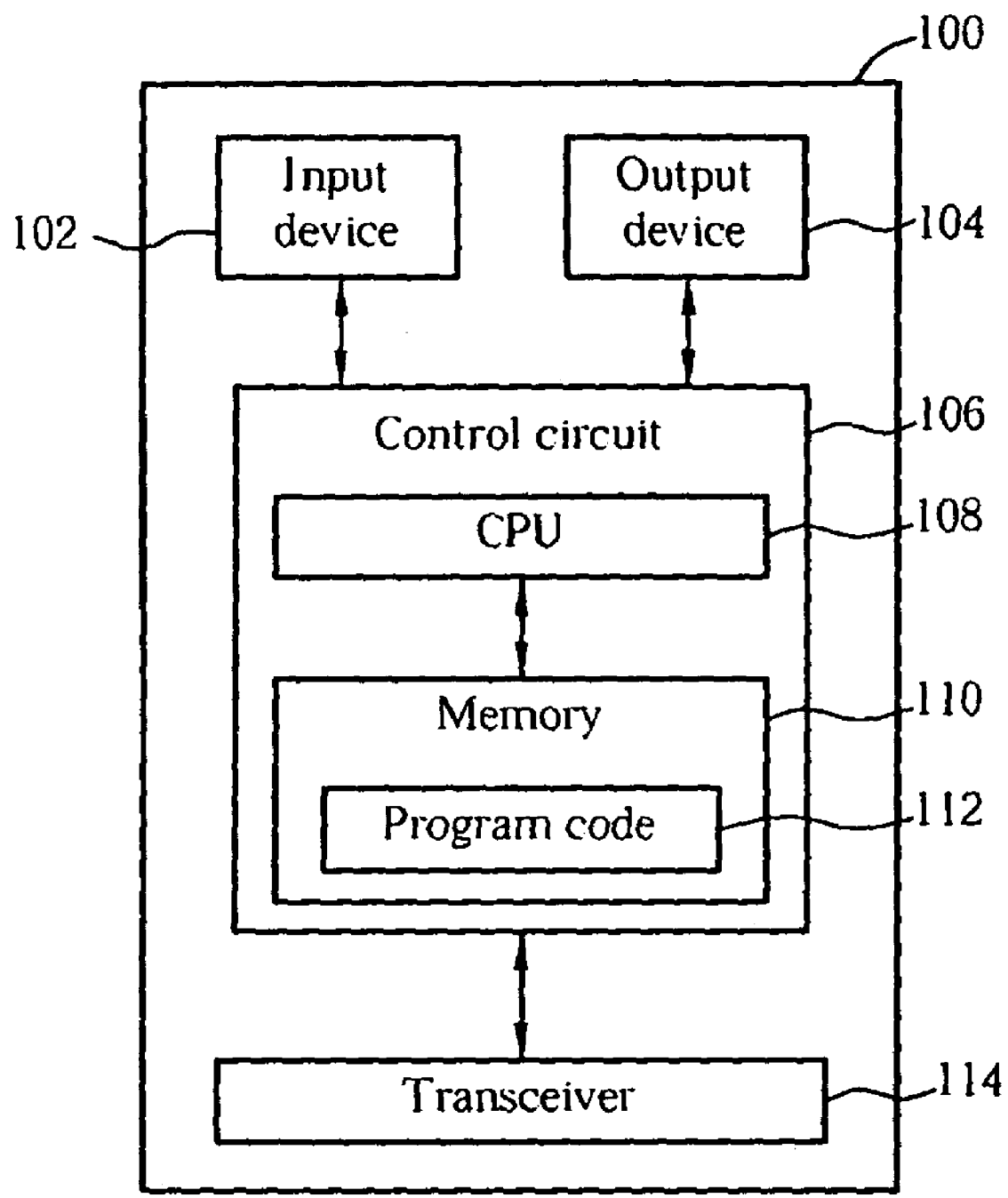
FIG. 1 is a functional block diagram of a communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a High Speed Package Access (HSPA) system of the third generation (3G) mobile communications system, supporting MIMO operation.

Figure 2:
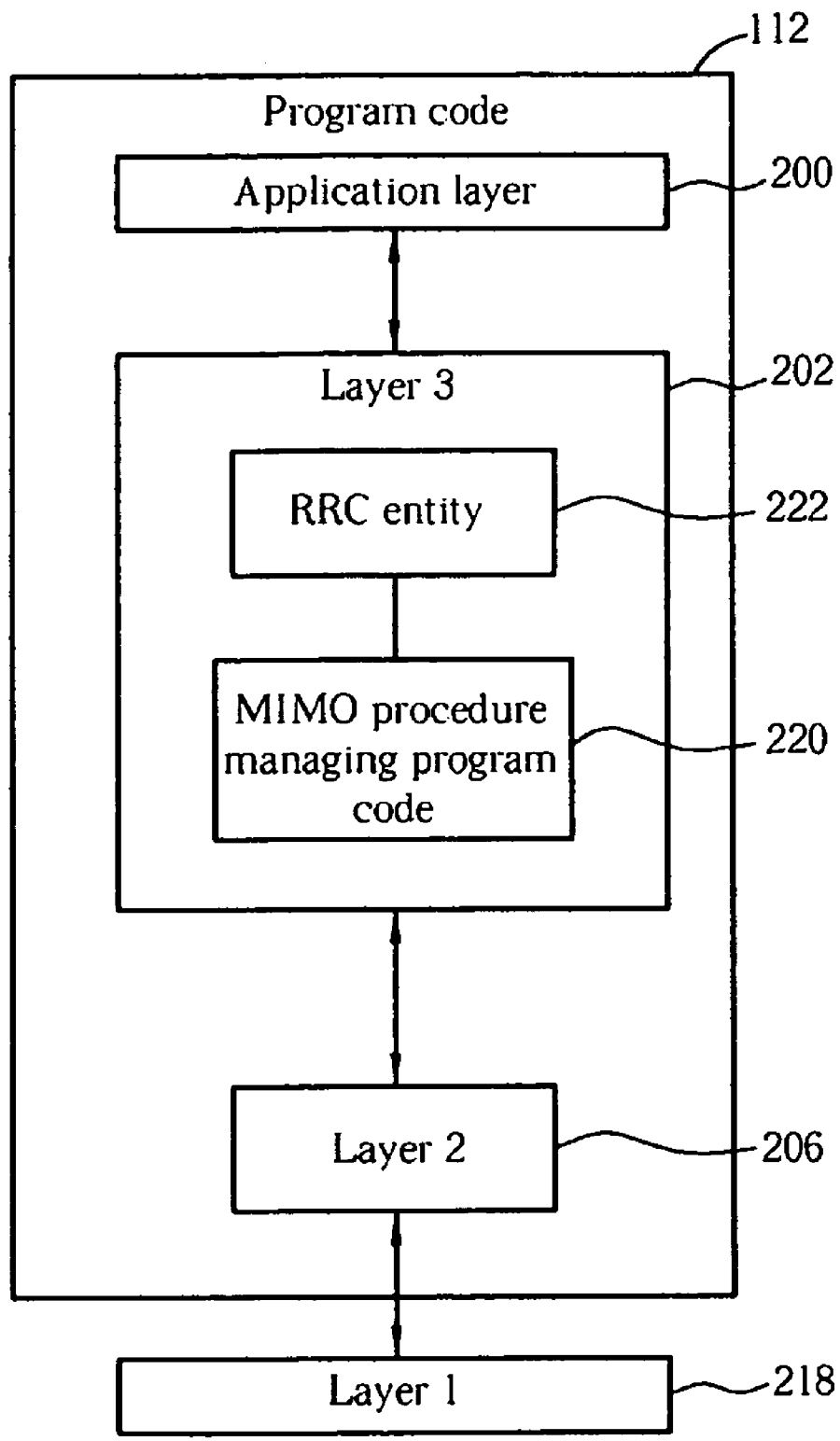
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 3 202 includes a radio resource control (RRC) entity 222, which is used for generating RRC messages and information elements (IEs) to control the Layer 1 218 and the Layer 2 206 and performing peer-to-peer RRC communication with other communications devices, such as a Node-B or a UTRAN. In addition, the RRC entity 222 can change an RRC state of the communications device 100, switching between an Idle mode, CELL_PCH, URA_PCH, CELL_FACH or CELL_DCH state.

Figure 3:
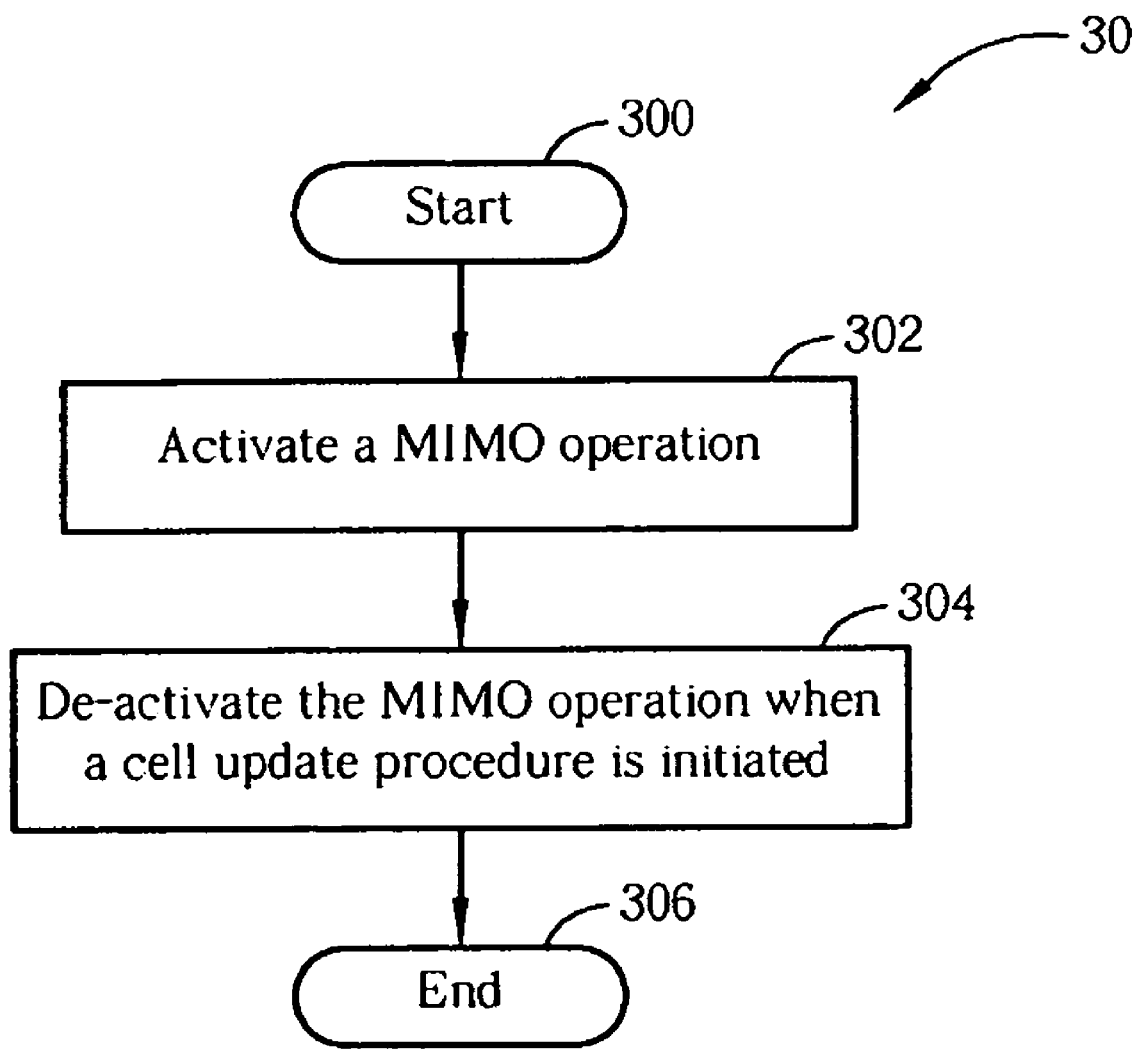
FIG. 3 is a flowchart diagram of a process according to an embodiment of the present invention.

Preferably, the communications device 100 receives a reconfiguration message from the UTRAN and utilizes a MIMO_STATUS variable to store MIMO configuration data of a MIMO parameter IE included in the reconfiguration message. In this situation, the embodiment of the present invention provides a MIMO procedure managing program code 220 to handle deactivating procedure of MIMO operation in order to avoid system malfunction occurring in the communications device 100. Please refer to FIG. 3, which illustrates a schematic diagram of a process 30 according to an embodiment of the present invention. The process 30 is utilized for improving the MIMO procedure for a UE of a wireless communications system, and can be compiled into the MIMO procedure managing program code 220. The process 30 includes the following steps:

Step 300: Start.
Step 302: Activate a MIMO operation.
Step 304: De-activate the MIMO operation when a cell update procedure is initiated.
Step 306: End.

According to the processes 30, the UE activates the MIMO operation according to the MIMO_STATUS variable and then triggers the lower layers (i.e. the Layer 1 218 and the Layer 2 206) to start operation in a MIMO mode. Meanwhile, the UE is in CELL_DCH state. During the MIMO operation, if radio link failure occurs, or an RLC unrecoverable error occurs, or transmission of a UE CAPABILITY INFORMATION message fails, the UE initiates a cell update procedure to remedy the situations. After the cell update procedure is initiated, the UE transits from CELL_DCH state to CELL_FACH state and clears the MIMO_STATUS variable. The UE further triggers the lower layers to stop operation related to MIMO to de-activate the MIMO operation.

In conclusion, the embodiment of the present invention requires the UE to deactivate the MIMO operation when the cell procedure is initiated to avoid malfunction in the lower layers when the UE leaves CELL_DCH state.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for improving a multi-input multi-output, called MIMO hereinafter, procedure for a user equipment, called UE hereinafter, of a wireless communications system, the method comprising the following steps performed by the UE:
    activating a MIMO operation; and
    de-activating the MIMO operation when a cell update procedure is initiated.

2. The method of claim 1, wherein the cell update procedure is initiated due to radio link failure, radio link control unrecoverable error or failed transmission of a UE CAPABILITY INFORMATION message.

3. The method of claim 1, wherein the activating the MIMO operation is activating the MIMO operation according to a MIMO_STATUS variable, which stores MIMO configuration data.

4. The method of claim 1, wherein the de-activating the MIMO operation comprises:
    clearing a MIMO_STATUS variable, which stores MIMO configuration data; and
    triggering lower layers of the UE to stop the all operation related to MIMO.

5. A communications device used in a communications system for improving a multi-input multi-output, called MIMO hereinafter, procedure to avoid system malfunction, the communications device comprising:
    a control circuit for realizing functions of the communications device;
    a central processing unit coupled to the control circuit for executing a program code to operate the control circuit; and
    a memory coupled to the central processing unit for storing the program code;
    wherein the program code comprises:
        activating a MIMO operation; and
        de-activating the MIMO operation when a cell update procedure is initiated.

6. The communications device of claim 5, wherein the cell update procedure is initiated due to radio link failure, radio link control unrecoverable error or failed transmission of a UE CAPABILITY INFORMATION message.

7. The communications device of claim 5, wherein the activating the MIMO operation is activating the MIMO operation according to a MIMO_STATUS variable, which stores MIMO configuration data.

8. The communications device of claim 5, wherein the de-activating the MIMO operation comprises:
    clearing a MIMO_STATUS variable, which stores MIMO configuration data; and
    triggering lower layers of the UE to stop the all operation related to MIMO.

* * * * *